April 4, 1933.  R. TILING  1,903,303
FLYING ROCKET
Filed June 13, 1931
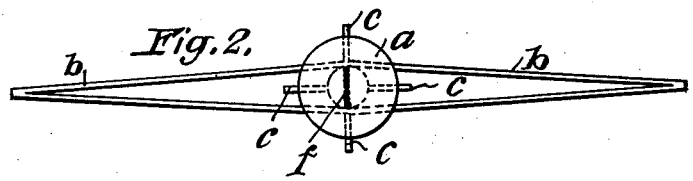
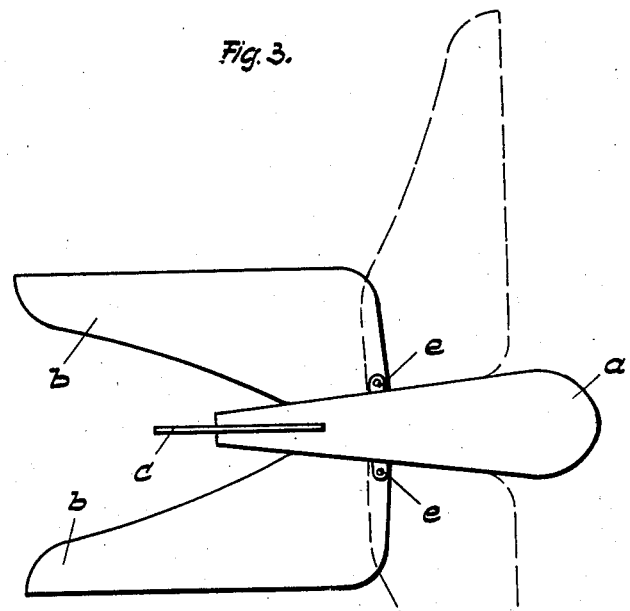
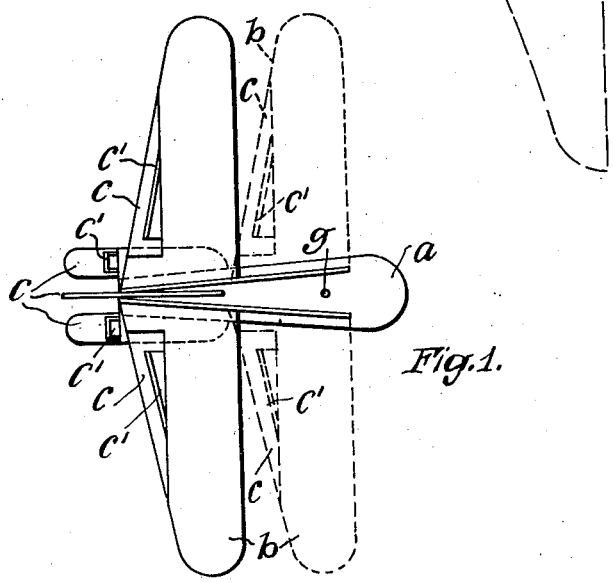

Patented Apr. 4, 1933

1,903,303

UNITED STATES PATENT OFFICE

REINHOLD TILING, OF OSNABRUCK, GERMANY

FLYING ROCKET

Application filed June 13, 1931. Serial No. 544,142.

It is already known in aircraft to provide same with oscillatably arranged supporting planes, which oscillate around vertical axles, in order to reduce the air resistance by backwards swinging of the supporting planes. Deviating from the known arrangements, the present invention is presumed to be applied to a flying rocket, the feature of which consists in that the supporting plane known per se, arranged oscillatable or shiftable on the rocket body, which plane during the ascending lies behind the centre of gravity of the rocket, folds when changing into gliding flight against the front portion of the body into the centre of gravity of the rocket.

Rocket aircrafts are not pulled like other aircraft but pushed by the recoil of highly compressed gases flowing out towards the rear. The aircraft will however tend, owing to this pushing movement, to deviate from the straight flight path. Means for overcoming this tendency are provided according to the application in that during the action of the rocket the supporting planes are arranged with their pressure centre on the rear end of the body, that is behind the centre of gravity of the rocket and only, when the rocket has finished its work and the aircraft commences to glide, are the supporting planes pushed forward or oscillated in order to effect a gliding, as the supporting planes must now carry the body of the rocket. The body acts therefore as a projectile during the first phase and as an aircraft in the second phase.

An embodiment of the invention is illustrated diagrammatically by way of example in the accompanying drawing in which:—

Fig. 1 is a top plan view of the rocket.
Fig. 2 is a front elevation of Fig. 1.
Fig. 3 is a top plan view of a modified form of construction.

On a rocket body $a$ (Fig. 1) supporting planes $b$ are arranged, which can be shifted on this body. Rudders $c$, $c'$ fitted on the supporting planes and on the tail serve for steering. The supporting planes may, for example as shown in Fig. 2, be fitted in such a manner that their outer ends form between them an acute angle, these ends being reinforced by struts for obtaining the necessary stability. Fig. 3 shows diagrammatically a form of construction, in which the supporting planes $b$ are arranged oscillatable around the point $e$ on the body $a$. The rockets $f$ (Fig. 2) are arranged superposed in the central axis of the aircraft. An extension may be provided under the body, which also serves for accommodating rockets and may contain additional driving tubes, which lie in the extension of the longitudinal axis of the main driving tube and are staggered parallel to the central axis and arranged in steps. As already mentioned the supporting planes $b$ (Figs. 1 and 2) are situated behind the centre of gravity of the body $a$ during the ascending movement of the rocket. These planes are mounted in guide grooves on the rocket body and when the highest point of flight is reached and the rocket is passing into horizontal position are propelled for example by spring action towards the front of the body that is into the centre of gravity of the rocket.

The shifting or oscillating of the supporting planes is effected from the driver's seat by winch mechanism, lever arrangement or automatically. By employing supporting planes, which form an acute angle at their ends, the torsion is reduced. Thus, very thin supporting planes can be employed. In view of the very high flying speed of a rocket aircraft, it will not be possible with the present size of the control for the driver to manipulate the steering. Means are provided according to the invention for overcoming this difficulty in that small rudders line $4C^1$ are let into the rudders $c$ and are employed during the high travelling speed, whereas the large rudder, as in the known aircraft is used for slower speeds and for the gliding. Consequently, in the case of high speed flight only a portion of the normal planes is actuated, whereas during gliding either only the large rudder or the interconnected rudders are attended to simultaneously and together.

I claim:—

1. A flying rocket, comprising in combination a rocket body, supporting planes shiftable on said body adapted during the ascending to lie behind the centre of gravity of the rocket and in passing over into gliding to move towards the front portion of said body so that their centre of pressure is in line with the centre of gravity of the rocket.

2. A flying rocket, comprising in combination a rocket body, supporting planes oscillatable on said body adapted during the ascending to lie behind the centre of gravity of the rocket and in passing over into gliding to move towards the front portion of said body so that their centre of pressure is in line with the centre of gravity of the rocket.

In testimony whereof I affix my signature.

REINHOLD TILING.